United States Patent [19]
Brafford et al.

[11] Patent Number: 6,042,338
[45] Date of Patent: Mar. 28, 2000

[54] DETUNED FAN BLADE APPARATUS AND METHOD

[75] Inventors: Perry W. Brafford, Chandler; Yoseph Gebre-Giorgis, Phoenix; Durbha V. Murthy, Tempe, all of Ariz.

[73] Assignee: AlliedSignal Inc., Morris Township, N.J.

[21] Appl. No.: 09/058,077

[22] Filed: Apr. 8, 1998

[51] Int. Cl.$^7$ .................................................. F01D 5/10
[52] U.S. Cl. ..................... 416/203; 416/175; 416/500; 29/889
[58] Field of Search ............... 416/231 B, 232, 416/233, 248, 175, 203, 500; 415/119; 29/889.1, 889, 901

[56] References Cited

U.S. PATENT DOCUMENTS

| | | |
|---|---|---|
| 2,870,958 | 1/1959 | Pinsley . |
| 2,933,286 | 4/1960 | Klint et al. ........................ 416/220 R |
| 3,058,528 | 10/1962 | Hiersch . |
| 3,536,417 | 10/1970 | Stiefel et al. ...................... 416/223 R |
| 4,097,192 | 6/1978 | Kulina ................................... 416/175 |
| 4,118,147 | 10/1978 | Ellis ..................................... 416/230 |
| 4,878,810 | 11/1989 | Evans ................................... 416/203 |
| 5,286,168 | 2/1994 | Smith . |
| 5,474,421 | 12/1995 | Rossmann . |
| 5,478,205 | 12/1995 | Chou et al. . |
| 5,524,341 | 6/1996 | Ferleger et al. ...................... 29/889.7 |
| 5,540,551 | 7/1996 | Heinig .................................. 416/190 |
| 5,667,361 | 9/1997 | Yeager et al. . |

FOREIGN PATENT DOCUMENTS 1 293 553  10/1972  United Kingdom .

*Primary Examiner*—Edward K. Look
*Assistant Examiner*—Rhonda Barton
*Attorney, Agent, or Firm*—Robert Desmond, Esq.

[57] ABSTRACT

A propulsion engine fan incorporates two sets of blades with recessed portions formed along the surface of each blade. One set of blades has a higher resonant frequency than the other set of blades. In an illustrative embodiment of the invention, first and second blade groups each comprise an airfoil portion forming a surface for directing the flow of a working fluid through the engine. Each of the first group of blades has first and second recessed regions formed from the blade surface and has a first resonant frequency. Each of the second group of blades has third and fourth recessed regions formed from the blade surface and has a second resonant frequency less than the first resonant frequency. The first and second group blades are arranged in an alternating pattern along the rotor portion of the fan.

20 Claims, 3 Drawing Sheets

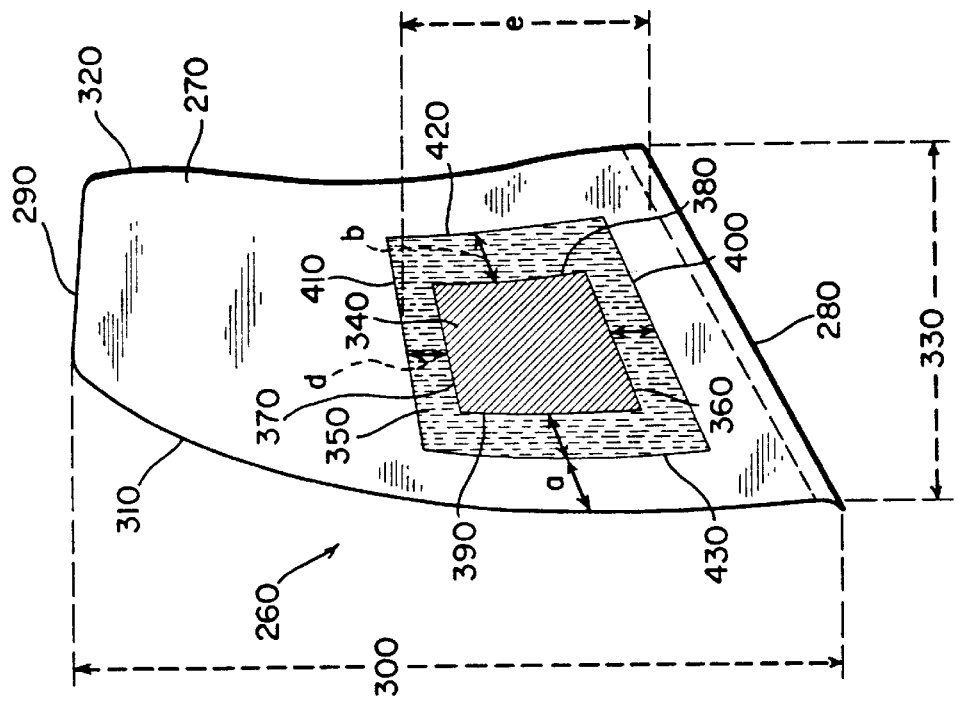
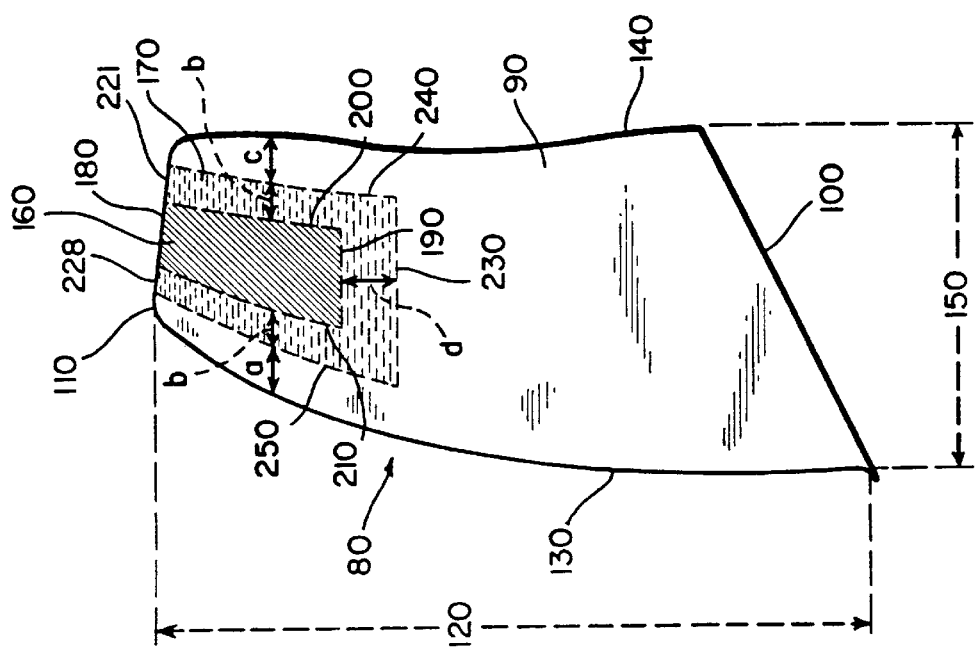

DETUNED FAN BLADE APPARATUS AND METHOD

FIELD OF THE INVENTION

The present invention relates to propulsion engine componentry, in general, and to an improved fan configuration, in particular.

BACKGROUND OF THE INVENTION

During operation of engines employing fans, the rotating fan blades, which are mounted to a rotor, are subjected to forced vibration due to oscillatory excitation at frequencies that coincide with integral multiples (harmonics) of the rotor's rotational frequency. Such excitation is often referred to as synchronous excitation. Synchronous blade excitation is typically created by non-uniformities in the flow of the motive fluid that may vary in the space around the circumference of the fan. Such non-uniformities may result from imperfections in the shape and spacing of the fan duct or supporting structures proximal to the fan intake. As a result of synchronous excitation, fan blades undergo high frequency deflections that create vibratory stresses. These vibratory stresses can result in high cycle fatigue cracking if their magnitude is not controlled. This problem is exacerbated by the fact that a fan blade typically has a number of resonant frequencies associated with its various vibratory modes. If the frequency of the oscillatory excitation to which the blade is subjected is close to one of its resonant frequencies, the vibratory stresses can quickly build up to destructive levels. This occurrence can be avoided if the rotating blade has a natural resonant frequency at or near the midpoint between two successive harmonics of the rotor's rotational frequency. Generally, within a given blade row, the airfoil shape of each of the blades is identical, within manufacturing tolerances. This configuration is sometimes referred to as "tuned.

In contrast to forced vibration, a complex aeroelastic phenomenon known as flutter may occur even if the blades are properly tuned between two harmonics. Briefly, flutter is an aeroelastic instability wherein vibratory deflections in the airfoil cause changes in aerodynamic loading that tend to increase, rather than dampen, the deflections. Consequently, flutter can increase the vibratory stress on the blade and cause high cycle fatigue cracking. Flutter may occur when two or more adjacent blades in a blade row vibrate at a frequency close to their natural resonant frequency and the vibratory motion between the adjacent blades assumes a certain phase relationship. One solution proposed in the past for increasing the resistance of turbine blade rows to flutter is to form the row using blades of varying frequency, a method referred to as "mis-tuning." The mis-tuned blades are installed in the blade row so that each blade alternates with another blade having a slightly different resonant frequency. Such mis-tuning makes it more difficult for the blades to vibrate at the same frequency, thereby inhibiting stall flutter. However, the increased number of blade natural frequencies increases the bandwidth of the blade responses to forced vibrations.

From the foregoing, it can be observed that the conventional methods of reducing forced vibratory response tend to promote flutter, and vice versa. One method claiming to prevent self-excited vibration between adjacent rotor blades without increasing the effects of forced vibration involves profiling or shortening the tips of half of the blades in the row in order to modify their resonant frequency, as discussed in U.S. Pat. No. 4,878,810 to Evans ("'810 patent").

Unfortunately, tip profiling creates compound leading edges and shortening the blade increases losses associated with blade tip clearance. Each of these tip modifications therefore undermines the aerodynamic performance of the blade.

Accordingly, what is needed is an improved propulsion engine fan configuration that eliminates flutter while reducing destructive resonant response, without material adverse effect on the aerodynamic performance characteristics of the engine.

SUMMARY OF THE INVENTION

According to the principles of the present invention, a propulsion engine fan incorporates two sets of blades with recessed portions formed along the surface of each blade. One set of blades has a higher resonant frequency than the other set of blades.

In one embodiment of the invention, first and second blade groups each comprise a plurality of blades each having an airfoil portion forming a surface for directing the flow of a working fluid through the engine. Each blade of the first group of blades has first and second recessed regions formed from the blade surface and has a first resonant frequency. Each blade of the second group of blades has third and fourth recessed regions formed from the blade surface and has a second resonant frequency different from the first resonant frequency of the first group. Blades selected from the first and second group are arranged in an alternating pattern along the rotor portion of the fan.

It is important to note that the utility of the principles of the instant invention is not limited to engine fans. Any motor employing rotating blades for directing the flow of a working fluid can apply the instant invention.

BRIEF DESCRIPTION OF THE DRAWINGS

The invention will be better understood from a reading of the following detailed description taken in conjunction with the drawing figures in which like reference designators are used to designate like elements, and in which:

FIG. 2 is a side plan view of a high resonant frequency blade according to the present invention;

FIG. 3 is a side plan view of a low resonant frequency blade according to the present invention;

DESCRIPTION OF THE PREFERRED EMBODIMENT

Figure 1:
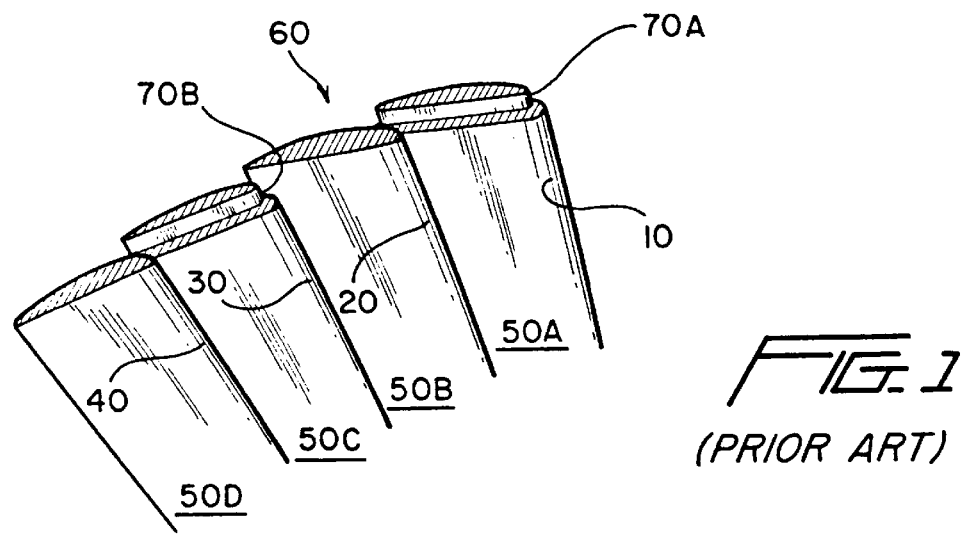
FIG. 1 is a partial detailed perspective view showing alternating tip profiles according to the prior art.

The drawing figures are intended to illustrate the general manner of construction and are not to scale. In the description and in the claims the terms left, right, front and back and the like are used for descriptive purposes. However, it is understood that the embodiment of the invention described herein is capable of operation in other orientations than is shown and the terms so used are only for the purpose of describing relative positions and are interchangeable under appropriate circumstances.

FIG. 1 shows upper end portions 10, 20, 30 and 40 of turbine rotor blades 50A, 50B, 50C and 50D representative of a blade row 60 according to the prior art '810 patent. The blade row 60 is adapted for use in a rotor assembly in a steam turbine. Blades 50A and 50B have one frequency and blades 50C and 50D have another frequency such that the row 60 is made up of a plurality of blades having alternating frequencies. The blades of the row 60 are identical to each other except that blades 50A and 50B have profiled tips 70A and 70B, respectively. The profiled tips 70A and 70B increase the frequency of blades 50A and 50B over that of blades 50C and 50D due to the loss of mass in the tip. However, profiled tips 70A and 70B, in effect, create an additional leading edge at the tips of blades 50A and 50B causing increased blade drag and decreased engine efficiency. In an alternative embodiment disclosed by the '810 patent, alternating blade tips could be made shorter to increase resonant frequency. However, because the overall efficiency of an engine fan decreases with increasing blade clearance with respect to the fan housing, blade tip shortening is not an ideal design choice for an engine fan.

Figure 4:
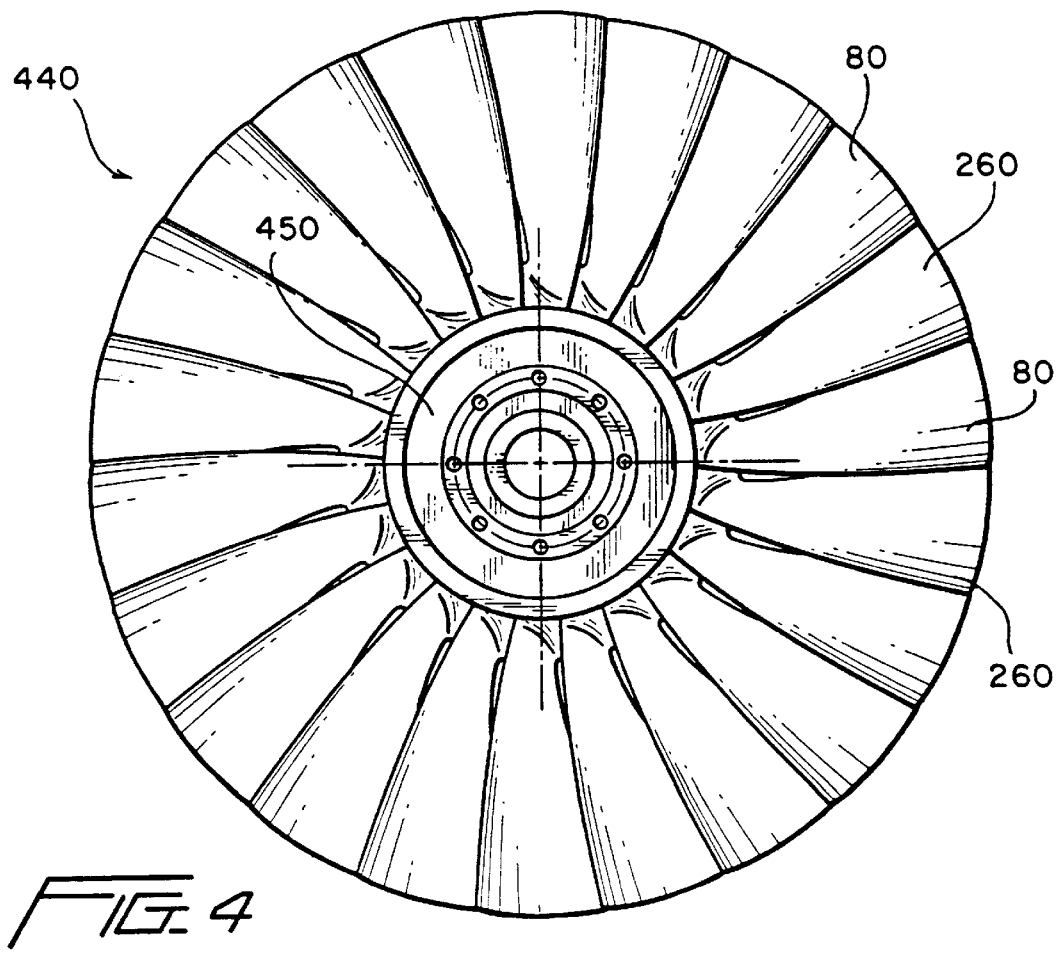
FIG. 4 is a front view of a rotor-blade assembly according to the present invention.

FIG. 2 shows a first group blade 80 adapted for use in an engine rotor assembly 440, as shown in FIG. 4, and incorporating features of one embodiment of the present invention. Blade 80 has a first resonant frequency. Blade 80 is partially defined by a surface 90 acting to direct the flow of a working fluid through the engine. Blade 80 is further defined by a base 100 adapted for connection to the rotor 450, as shown in FIG. 4, and a tip 110. The portion of the blade disposed between base 100 and tip 110 defines blade spanlength 120. A leading edge 130 and a trailing edge 140 further define blade 80. The portion of the blade disposed between leading edge 130 and trailing edge 140 defines a blade chordlength 150 that varies in magnitude from the base 100 to the tip 110. The term "local" when used in conjunction with a parameter such as chordlength means the parameter's magnitude at the location on the blade of the structure being described.

Disposed along surface 90 are first recessed region 160 and second recessed region 170. First recessed region 160 is bounded by first border 180, second border 190, third border 200 and fourth border 210. First border 180 coincides with tip portion 110. Second border 190 is substantially parallel to first border 180 and is disposed radially inward from first border 180 a distance in the range of 5% to 38% of spanlength 120. Third border 200 is substantially perpendicular to first border 180 and is disposed from trailing edge 140 a distance in the range of 20% to 45% of the local chordlength 150. Fourth border 210 is substantially parallel to third border 200 and is disposed from leading edge 130 a distance in the range of 15% to 35% of the local chordlength 150. First recessed region 160 is disposed below surface 90 a distance in the range of 1 to 15 percent of the local blade thickness.

Second recessed region 170 surrounds first recessed region 160 on three sides and is bounded by fifth and sixth borders 220, 221, seventh border 230, eighth border 240 and ninth border 250. Fifth and sixth borders 220, 221 coincide with tip portion 110. Seventh border 230 is substantially parallel to fifth and sixth borders 220, 221 and is disposed radially inward from fifth and sixth borders 220, 221 a distance in the range of 15% to 40% of spanlength 120. Eighth border 240 is substantially perpendicular to fifth and sixth borders 220, 221 and is disposed from trailing edge 140 a distance in the range of 15% to 30% of the local chordlength 150. Ninth border 250 is substantially parallel to eighth border 240 and is disposed inward from leading edge 130 a distance in the range of 10% to 20% of the local chordlength 150. Second recessed region 170 is disposed below surface 90 a distance in the range of 1 to 15 percent of the local blade thickness.

The transition from first recessed region 160 through second recessed region 170 to surface 90 may be gradual or stepped. Recessed regions 160, 170 may be formed by chemical milling, precision mechanical cutting, employing a mold or by other methods recognized in the art. Alternatively, recessed regions 160, 170 may be displaced radially inward such that surface 90 is immediately adjacent to tip 110.

FIG. 3 shows a second group blade 260 adapted for use in an engine rotor assembly 440, as shown in FIG. 4, and incorporating features of one embodiment of the present invention. Blade 260 has a resonant frequency at least 0.5 percent different from the resonant frequency associated with first group blade 80. Blade 260 is partially defined by a surface 270 acting to direct the flow of a working fluid through the engine. Blade 260 is further defined by a base 280 adapted for connection to the rotor 450, as shown in FIG. 4, and a tip 290. The portion of the blade 260 disposed between base 280 and tip 290 defines blade spanlength 300. A leading edge 310 and a trailing edge 320 further define blade 260. The portion of the blade 260 disposed between leading edge 310 and trailing edge 320 defines blade chordlength 330.

Disposed along surface 270 are third recessed region 340 and fourth recessed region 350. Tenth border 360, eleventh border 370, twelfth border 380 and thirteenth border 390 bound third recessed region 340. Tenth border 360 is substantially parallel to base 280 and is disposed from base 280 a distance in the range of 2% to 25% of spanlength 300. Eleventh border 370 is substantially parallel to tenth border 360 and is disposed from base 280 a distance in the range of 5% to 53% of spanlength 300. Twelfth border 380 is substantially perpendicular to tenth border 360 and is disposed from trailing edge 320 a distance in the range of 20% to 45% of the local chordlength 330. Thirteenth border 390 is substantially parallel to twelfth border 380 and is disposed from leading edge 310 a distance in the range of 15% to 35% of the local chordlength 330. Third recessed region 340 is disposed below surface 270 a distance in the range 1 to 15 percent of the local blade thickness.

Fourth recessed region 350 surrounds third recessed region 340 and is bounded by fourteenth border 400, fifteenth border 410, sixteenth border 420 and seventeenth border 430. Fourteenth border 400 is substantially parallel to base 280 and is disposed from base 280 a distance in the range of 0% to 15% of spanlength 300. Fifteenth border 410 is substantially parallel to fourteenth border 400 and is disposed from fourteenth border 400 a distance in the range of 15% to 55% of spanlength 300. Sixteenth border 420 is substantially perpendicular to fourteenth border 400 and is disposed from trailing edge 320 a distance in the range of 15% to 30% of the local chordlength 330. Seventeenth border 430 is substantially parallel to sixteenth border 420 and is disposed from leading edge 310 a distance in the range of 10% to 20% of the local chordlength 330. Fourth recessed region 350 is disposed below surface 270 a distance in the range of 1 to 15 percent of local blade thickness.

The transition from third recessed region 340 through fourth recessed region 350 to surface 270 may be gradual or stepped. Recessed regions 340, 350 may be formed by chemical milling, precision mechanical cutting, employing a mold or by other methods recognized in the art.

Figure 5:
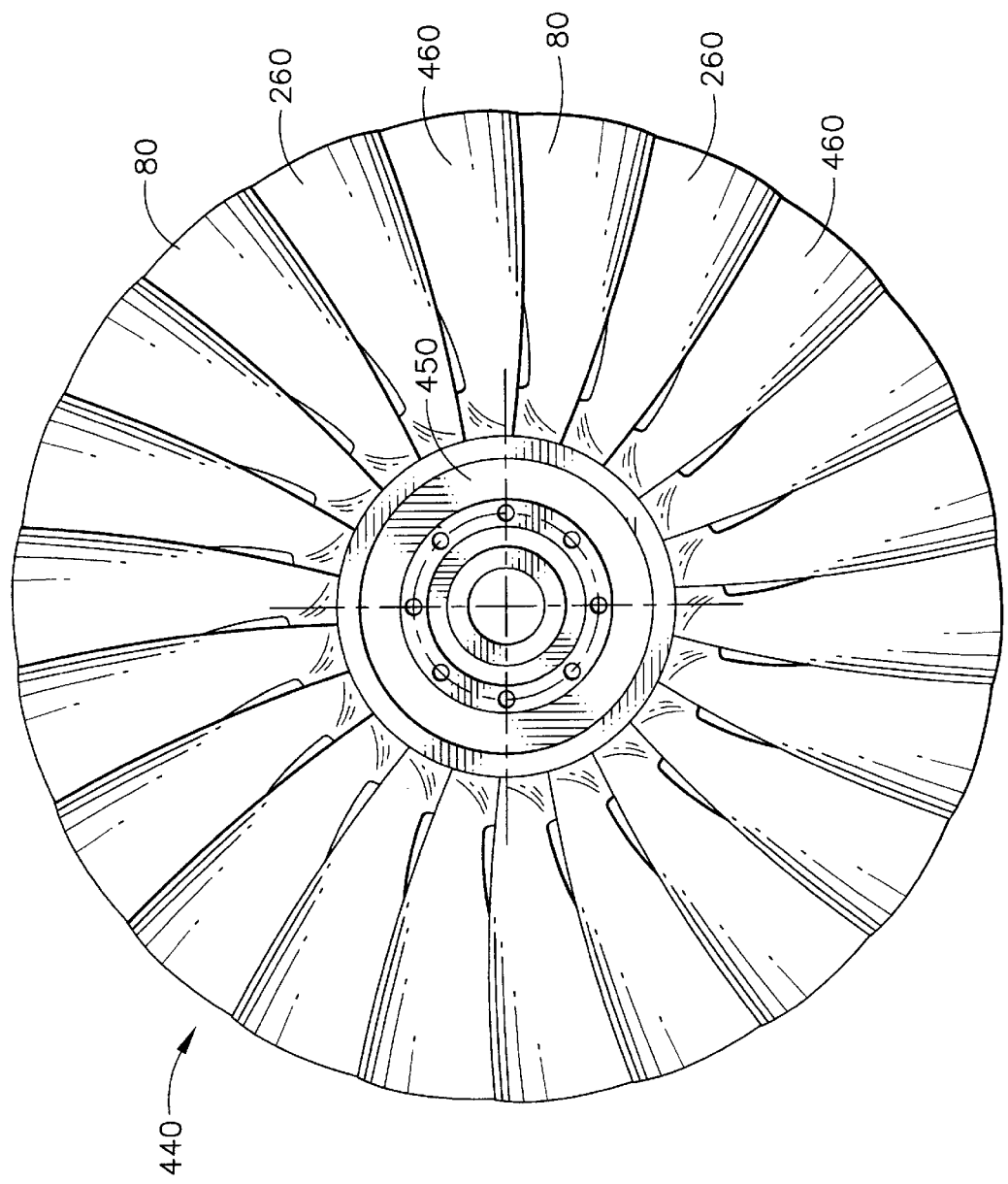
FIG. 5 is a front view of a rotor blade assembly showing three groups of blades.

FIG. 4 illustrates a rotor assembly 440 incorporating features of the present invention. In the preferred embodiment of the present invention, first group blades 80 and second group blades 260 are attached to and arranged in an alternating pattern around rotor 450. The blades 80, 260 are integrally formed from rotor 450, thereby forming a blisk. Alternatively, the blades 80, 260 can be inserted into grooves through the perimeter of rotor 450. It is important to note that, according to the present invention, first group blades 80 and second group blades 260 can be arranged around rotor 450 in a wide variety of alternative patterns (for example, by arranging groups of blades from each group in half circle sectors, quarter circle sectors, etc.) without significantly detracting from desired engine performance. In one alternative embodiment, only one of the groups of blades 80, 260 has a recessed region. In a second alternative embodiment, there are more than two groups of blades with each group having a resonant frequency at least 0.5 percent different from the resonant frequency of all other groups. FIG. 5 shows another alternative embodiment wherein rotor 450 has three groups of blades 80,260, and 460 with each group having a resonant frequency at least 0.5 percent different from resonant frequency of the other groups. In the limit the number of groups equals the number of blades so that each group is comprised of a single blade. In yet third alternative embodiment, the recessed regions can be located on an interior surface of the blade if the blade is hollow or on the base or root of the blade, Although the invention has been described in terms of the preferred embodiment of a fan blade, it will be appreciated by those skilled in the art that various changes and modifications may be made to the preferred embodiment without departing from the spirit or scope of the invention. For example the present invention could be applied to compressor blade or turbine blades. It is intended that the scope of the invention not be limited in any way to the preferred embodiment shown and described but that the invention be limited only by the claims appended hereto.

What is claimed is:

1. In a gas turbine engine having a rotating component with a plurality of blades extending therefrom, said component comprising:
   a first group of blades, each of said blades in said first group of blades having a first resonant frequency;
   a second group of blades, each of said blades in said second group of blades having a second resonant frequency; and
   said first resonant frequency and said second resonant frequency being at least 0.5 percent different.

2. The component of claim 1 further comprising at least one additional group of blades, each of said blades in said additional group having a third resonant frequency that is at least 0.5 percent different than the respective resonant frequency of all other blade groups in said component.

3. The component of claim 2 wherein each of said group of blades has only a single blade.

4. The component of claim 1, wherein:
   each of said blades in said first group of blades comprises a first surface for directing the flow of a working fluid through the engine;
   a base portion connected to the rotor and a tip portion disposed radially from said base portion, said base portion and said tip portion defining a blade spanlength therebetween;
   a leading edge portion extending from said base portion to said tip portion and a trailing edge portion extending from said base portion to said tip portion disposed from said leading edge portion, said leading edge portion and said trailing edge portion defining a local chordlength therebetween; and
   said first surface for directing the flow of a working fluid having at least one recessed region.

5. The component of claim 4, wherein:
   said recessed region comprises a first recessed region, said first recessed region bounded by first, second, third and fourth borders;
   said first border coinciding with said tip portion;
   said second border disposed substantially parallel to said first border at a distance from said first border equal to no more than 38% of said spanlength;
   said third border disposed substantially perpendicular to said first border and at a distance from said trailing edge portion equal to no more than 45% of said local chordlength; and
   said fourth border disposed substantially parallel to said third border at a distance from said leading edge portion equal to no more than 35% of said local chordlength.

6. The component of claim 5, wherein:
   said recessed region further comprises a second recessed region surrounding said first recessed region, said second recessed region bounded by fifth, sixth, seventh, eighth and ninth borders;
   said fifth and sixth borders coinciding with said tip portion;
   said seventh border disposed substantially parallel to said fifth and sixth borders at a distance from said fifth and sixth borders equal to no more than 40% of said spanlength;
   said eighth border disposed substantially perpendicular to said fifth and sixth borders and at a distance from said trailing edge portion equal to no more than 30% of said local chordlength; and
   said ninth border disposed substantially parallel to said eighth border at a distance from said leading edge portion equal to no more than 20% of said local chordlength.

7. The component of claim 6, wherein said first and second recessed regions are disposed below said first surface at a distance in the range of 1 to 15 percent of a local blade thickness.

8. The component of claim 6, wherein:
   each of said blades of said second group comprises a second surface for directing the flow of a working fluid through said engine;
   a base portion connected to said rotor and a tip portion distally disposed from said base portion, said base portion and said tip portion defining a spanlength therebetween;
   a leading edge portion extending from said base portion to said tip portion and a trailing edge portion distally disposed from said leading edge portion, said leading edge portion and said trailing edge portion defining a local chordlength therebetween; and
   said second surface for directing the flow of a working fluid having at least one recessed region.

9. The component of claim 8, wherein:
   said recessed region of said second surface comprises a third recessed region, said third recessed region bounded by tenth, eleventh, twelfth and thirteenth borders;
   said tenth border disposed substantially parallel to said base portion at a distance from said base portion equal to no more than 25% of said spanlength;

said eleventh border disposed substantially parallel to said tenth border at a distance from said base portion equal to no more than 53% of said spanlength;

said twelfth border disposed substantially perpendicular to said tenth border and at a distance from said trailing edge portion equal to no more than 45% of said local chordlength; and said thirteenth border disposed substantially parallel to said twelfth border at a distance from said leading edge portion equal to no more than 35% of said local chordlength.

10. The component of claim 9, wherein:

said recessed region of said second surface further comprises a fourth recessed region surrounding said third recessed region, said fourth recessed region bounded by fourteenth, fifteenth, sixteenth and seventeenth borders;

said fourteenth border disposed substantially parallel to said base portion at a distance from said base portion equal to no more than 15% of said spanlength;

said fifteenth border disposed substantially parallel to said fourteenth border at a distance from said base portion equal to no more than 55% of said spanlength;

said sixteenth border disposed substantially perpendicular to said fourteenth border and at a distance from said trailing edge portion equal to no more than 30% of said local chordlength; and said seventeenth border disposed substantially parallel to said sixteenth border at a distance from said leading edge portion equal to no more than 20% of said local chordlength.

11. The component of claim 9, wherein said third and fourth recessed regions are below said second surface at a distance 1 to 15 percent of a local blade thickness.

12. The component of claim 1 wherein the blades of said first and second group blades are arranged in an alternating pattern along the rotor.

13. The component of claim 1 wherein the blades of said first and second groups are integrally formed from the rotor.

14. The component of claim 1 wherein the blades of said first and second groups are insertable to said rotor.

15. The component of claim 1, wherein:

each of said blades in said first group of blades has an interior surface defining an interior cavity;

a base portion connected to the rotor and a tip portion disposed radially from said base portion, said base portion and said tip portion defining a blade spanlength therebetween;

a leading edge portion extending from said base portion to said tip portion and a trailing edge portion extending from said base portion to said tip portion disposed from said leading edge portion, said leading edge portion and said trailing edge portion defining a local chordlength therebetween, and said interior surface having at least one recessed region.

16. The component of claim 1, wherein:

each of said blades comprising a base portion connected to the rotor and a tip portion disposed radially from said base portion, said base portion and said tip portion defining a blade spanlength therebetween;

a leading edge portion extending from said base portion to said tip portion and a trailing edge portion extending from said base portion to said tip portion disposed from said leading edge portion, said leading edge portion and said trailing edge portion defining a local chordlength therebetween;

a root portion extending radially inward from said base portion; and said base portion having a surface with at least one recessed region.

17. A method of preventing flutter and reducing resonant response associated with propulsion engine blades, said blades being disposed along a rotor, each of said blades having a surface for directing the flow of a working fluid through the engine, the method comprising the steps of:

forming a first and second recessed portion in each surface of selected blades; and forming a third and fourth recessed portion in each surface of selected remaining blades.

18. A method in accordance with claim 17, wherein:

each surface of every other blade has said first and second recessed portions; and each surface of each remaining blade has said third and fourth recessed portions.

19. A method in accordance with claim 17, wherein each of said recessed portions is formed by chemical milling of said surface.

20. A method in accordance with claim 17, wherein each of said recessed portions is formed by precision cutting of said surface.

* * * * *